H. B. MARTIN.
AUTOMATIC PASSENGER ELEVATOR.
No. 173,483. Patented Feb. 15, 1876.
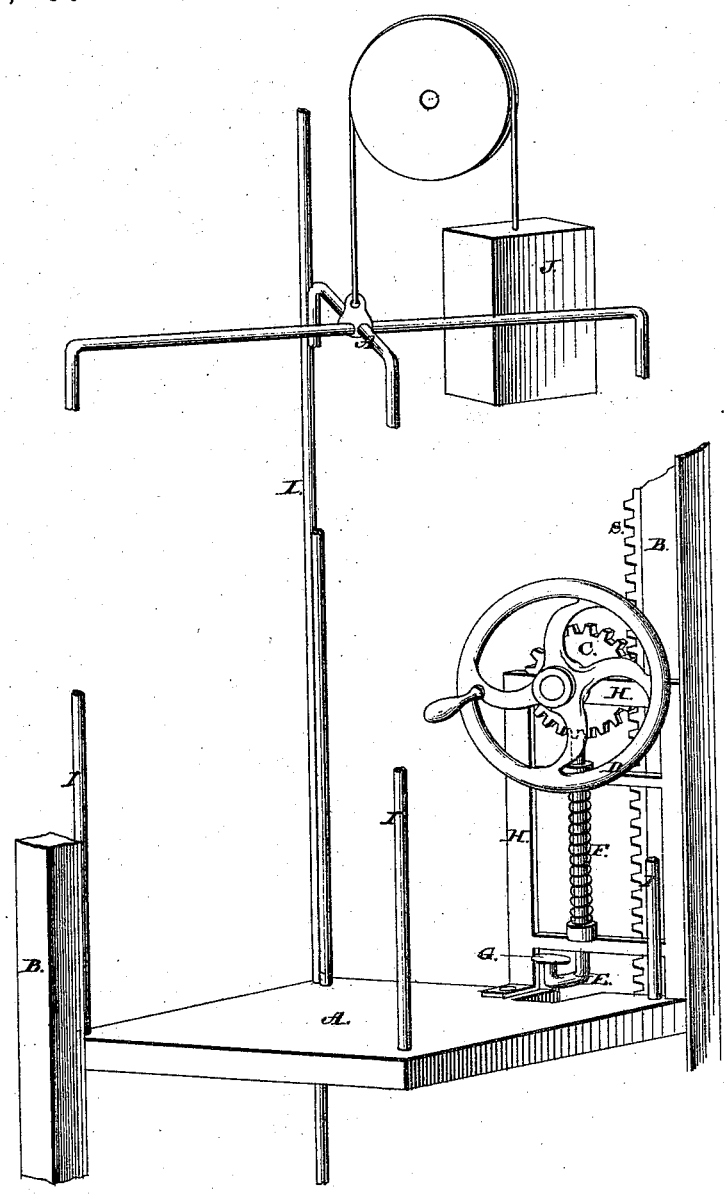
Attest:
Inventor:
Horace B. Martin

UNITED STATES PATENT OFFICE.

HORACE B. MARTIN, OF CHICAGO, ILLINOIS.

IMPROVEMENT IN AUTOMATIC PASSENGER-ELEVATORS.

Specification forming part of Letters Patent No. 173,483, dated February 15, 1876; application filed July 29, 1875.

*To all whom it may concern:*

Be it known that I, HORACE B. MARTIN, of Chicago, Cook county, Illinois, have invented certain Improvements in Automatic Passenger-Elevators, of which the following is a specification:

The object of this invention is to provide a cheap and safe passenger-elevator system, to fill the demand for easy means of rapid transit to and from the upper stories of high buildings, specially for the benefit of women and invalids, but applicable in all cases where the conditions are such as do not require large power-elevators, by means whereof the individual, in descending, stores up the power otherwise lost, to be utilized again in making the ascent, and acting without mechanical power, further than what can be easily exerted by the passenger; to effect which, for the large power-elevator, I substitute a series of small automatic elevators for single passengers, each consisting of a small cab, a counterpoise constantly adjusted to the weight of the cab and of one person, and attached to the cab a suitable propelling apparatus to give motion, and a brake to regulate the same, and to hold the cab in position when not in operation, constructed and operated substantially as follows:

In the drawing, A represents a small cab, say about twenty-six inches square; B B, upright guide-posts, on one of which a toothed rack is fastened for the entire length; C, pinion engaging with rack S; D, crank-wheel, which may be used also as a brake-wheel, keyed on the pinion-shaft; E, a rod terminating at one end with a pawl or brake, which is intended to engage with pinion C, brake-wheel D, or rack S, as may be preferred, and at the other end with foot-plate or pedal G, held in proper place by spring F; G, foot-plate or pedal, connecting with rod E, which, on being pressed down into a recess in the floor of the cab, relieves the brake and unlocks the elevator, pinion C, crank-wheel D, and rod E being properly set in a frame, H, which is bolted to, and forms part of, the cab; I, rod or cable extending from floor to roof, which may be used as a substitute for the rack and pinion, or conjointly with them; J, a counterbalance suspended by a cable passing over a pulley and attached to the cab.

The weight of the counter-balance J should be as nearly as possible equal to the weight of the cab, and of one person added thereto, its function being to act (in combination with the brake) as a reservoir, in which the power acquired by the descent of the passenger is held in store until required, and then utilized for the next ascent.

Inasmuch as a description of the operation of a single elevator will suffice to illustrate that of the series, it may be briefly explained as follows: The person steps into the cab, balancing it by the increased weight, which relieves the strain on lock or brake E; then, taking the crank in hand, and pressing one foot on pedal G, unlocks the machine, and, by turning the crank with only sufficient force to overcome the friction, moves easily and rapidly up or down at will, while the motion is rendered positive and readily controlled by the crank; and on stopping, by removing the foot from the pedal G, the machine is locked again and held in position.

When a series of these automatic passenger-elevators are placed in a building, it is presumable that during business hours the cabs will ordinarily be distributed naturally among the several floors; and, if not, it would require but little attention from a porter to keep them in proper distribution.

It is evident that the utility of the above-described device depends upon combining the counter-balance, properly adjusted as to weight, with a self-acting brake and propelling apparatus on the cab, and that any appliance, such as pulleys, operating-ropes, chains, or belts, may be used to give motion; therefore, in order to clearly define the points on which protection is sought, this specification contemplates the use of any or all of those well-known devices for propulsion, but preferably adopting the rack and pinion to illustrate the invention in its simplest and most perfect form.

I am aware that elevators have been constructed upon the principle of varying the counter-balance to meet the requirements of of each recurring load—as, for instance, the "water-balance" long used in California for hoisting earth through a shaft connected with a tunnel—and also upon the principle of varying the load upon the cab to suit the counter-balance, as in chain-elevators, where the chain is made to perform the service of a brake, and is passed over a pulley to adjust the load to the counter-balance, both of which are specially disclaimed, as it is the main object of this device to avoid those frequent adjustments which constitute the distinguishing features and chief value of the two inventions above cited.

I am aware that dumb-waiters for freight and kitchen purposes have also been in use, but hitherto they have not been furnished with appliances to enable them to perform the service contemplated in this device; and it is believed that such automatic service in passenger-elevators has never been sought by means of an equal balance as a system.

I claim—

In an automatic passenger-elevator, in combination with counter-balance J, adjusted as described, brake or lock E and pedal G, with the propelling apparatus attached to the cab, as illustrated, by pinion C and crank D, acting with and upon rack S on guide-post B, constructed and operated substantially as and for the purposes set forth.

HORACE B. MARTIN.

Witnesses:
E. T. CUSHING,
C. F. WEBER.